United States Patent [19]

Fagundes et al.

[11] Patent Number: 5,073,263
[45] Date of Patent: Dec. 17, 1991

[54] METHOD AND ARTICLE FOR RESTRAINING EXTRUSION OF FEED SPACERS AND CIRCUMFERENTIAL EXPANSION IN SPIRAL FILTRATION MODULES

[76] Inventors: Carlos A. Fagundes, 52 Hanks St., Lowell, Mass. 01852; Thomas C. McDermott, Jr., 19 Beliveau Dr., Lynn, Mass. 01904; David M. Colby, 40A Circuit Rd., Medford, Mass. 02155

[21] Appl. No.: 586,578

[22] Filed: Sep. 21, 1990

[51] Int. Cl.$^5$ .............................................. B01D 61/08
[52] U.S. Cl. ................... 210/321.83; 210/487; 210/494.1
[58] Field of Search ............... 210/34.74, 34.83, 494.1, 210/497.1, 487

[56] References Cited

U.S. PATENT DOCUMENTS 4,301,013 11/1981 Setti et al. .................. 210/321.83 X
4,906,372 3/1990 Hopkins .......................... 210/321.74

Primary Examiner—Frank Spear

[57] ABSTRACT

An ultrafiltration module and method of constructing same is the subject of the present invention. The module comprises a permeate collector tube and one or more membrane leaves wound around the tube together with a feed channel spacer so as to present spaced layers of membrane leaves or envelopes that are contacted by fluid flowing axially through the module in the channel provided by the feed spacer screen. The feed spacer screen projects beyond the terminal ends of the leaves to present an open mesh outerwrap screen circumscribing the wound leaves. A plurality of restraining bands are provided in longitudinally spaced relationship along the length of the module. These bands are designed to hold the entire module assembly in tight spiral relationship. Preferably, the bands are constructed of heat shrinkable material and are thus secured in place and tightened by the application of heat. After the restraining bands are in place, a bypass screen also of open mesh configuration is wrapped around the outerwrap and the restraining bands and secured by overlapping it onto itself and fusing the overlapped portion.

11 Claims, 2 Drawing Sheets

METHOD AND ARTICLE FOR RESTRAINING EXTRUSION OF FEED SPACERS AND CIRCUMFERENTIAL EXPANSION IN SPIRAL FILTRATION MODULES

BACKGROUND OF THE INVENTION

This invention relates generally to ultrafiltration technology and, more specifically, to a spiral wound filtration module for use in cross flow filtration and method of constructing same.

Semi-permeable membranes are utilized in both high pressure reverse osmosis and low pressure ultrafiltration and microfiltration processes. A typical design for an ultrafiltration device is to provide a spiral wrapped filtration module. Such a module is made by providing a permeate tube around which is wound one or more permeate envelopes or membrane leaves. These membrane leaves are separated by feed spacer screens. The spirally wound leaves have heretofore been held in place by a bypass spacer screen which is fused to the outside end of one layer of the feed spacer screen. The bypass screen is then wound around the circumference of the assembled leaves and ultimately fused to itself to complete the module.

The module is loaded into a housing or pressure vessel and operated at a slight pressure drop across the module. Normal flow conditions also include temperatures in the range of 80°–140° F. A combination of the hydraulic forces exerted on the module and the heat from the processing operation have a tendency to soften the thermoplastic materials utilized as the bypass and feed spacer screens. This may cause the spiral to loosen reducing the frictional forces holding successive material layers and ultimately causing the feed spacer screen to extrude. Such extrusion can lead to sanitation problems and low operating efficiency caused by low flow regions attributable to the extrusion problem. The increase in outer diameter which results from the extrusion also makes the modules difficult to remove for replacement, inspection or testing.

As far as is known, there has been no prior attempt to reduce or eliminate feed spacer extrusion or circumferential expansion in spiral wound ultrafiltration modules of the type described. For non-sanitary applications, the problem is avoided by an overwrap such as fiberglass-reinforced epoxy that is allowed to harden and form a rigid outer shell for the module. This is unacceptable in sanitary applications or other uses where no stagnant flow areas are permissible since stagnant flow is inherent along the surface of the hardened outer shell.

It is, therefore, an object of the present invention to provide an ultrafiltration module and method of constructing same which substantially precludes feed spacer extrusion and circumferential expansion by circumscribing the module with one or more restraining bands.

As a corollary to the above object, it is an objective of this invention to substantially reduce or eliminate feed spacer extrusion and circumferential expansion without creating dead space which would adversely impact hygienic conditions or reduce operating efficiency.

Another object of the invention is to provide an ultrafiltration module which is not subject to feed spacer extrusion or circumferential expansion and a method of constructing same which will not require modification of existing pressure vessels that comprise a part of typical filtration systems.

It is also one of the objectives of our invention to provide an ultrafiltration module and method of constructing it which will not undergo significant feed spacer extrusion or circumferential expansion and which can be utilized with modules having one or a plurality of membrane leaves.

Other objects of the invention will be made clear or become apparent from the following description and claims when read in light of the accompanying drawings wherein:

Figure 1:
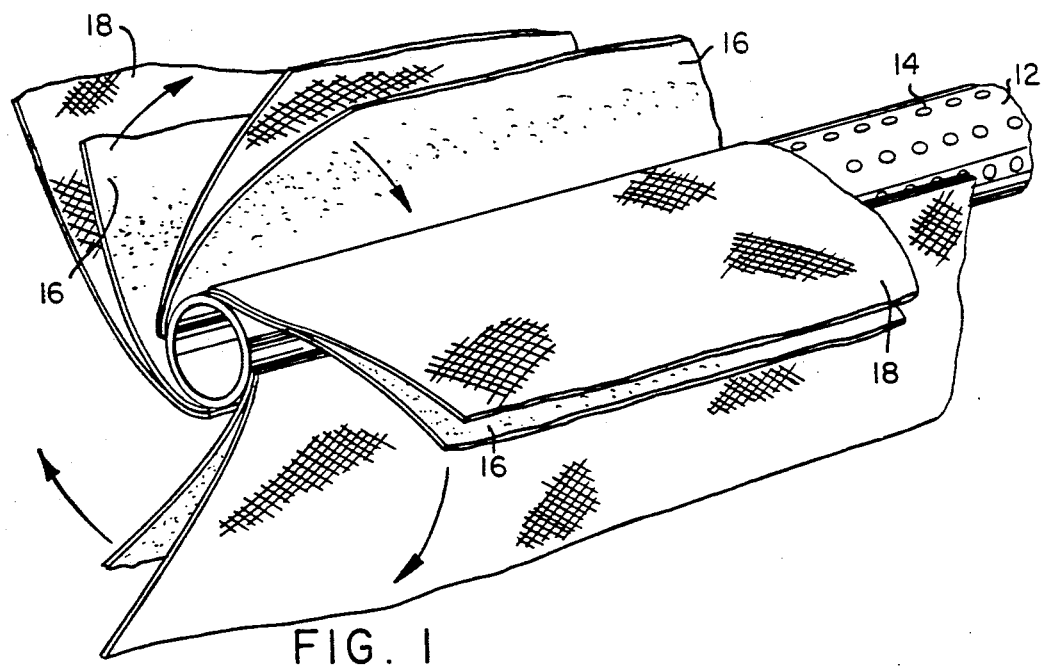
FIG. 1 is a perspective view of a filtration module constructed according to the present invention.
Figure 2:
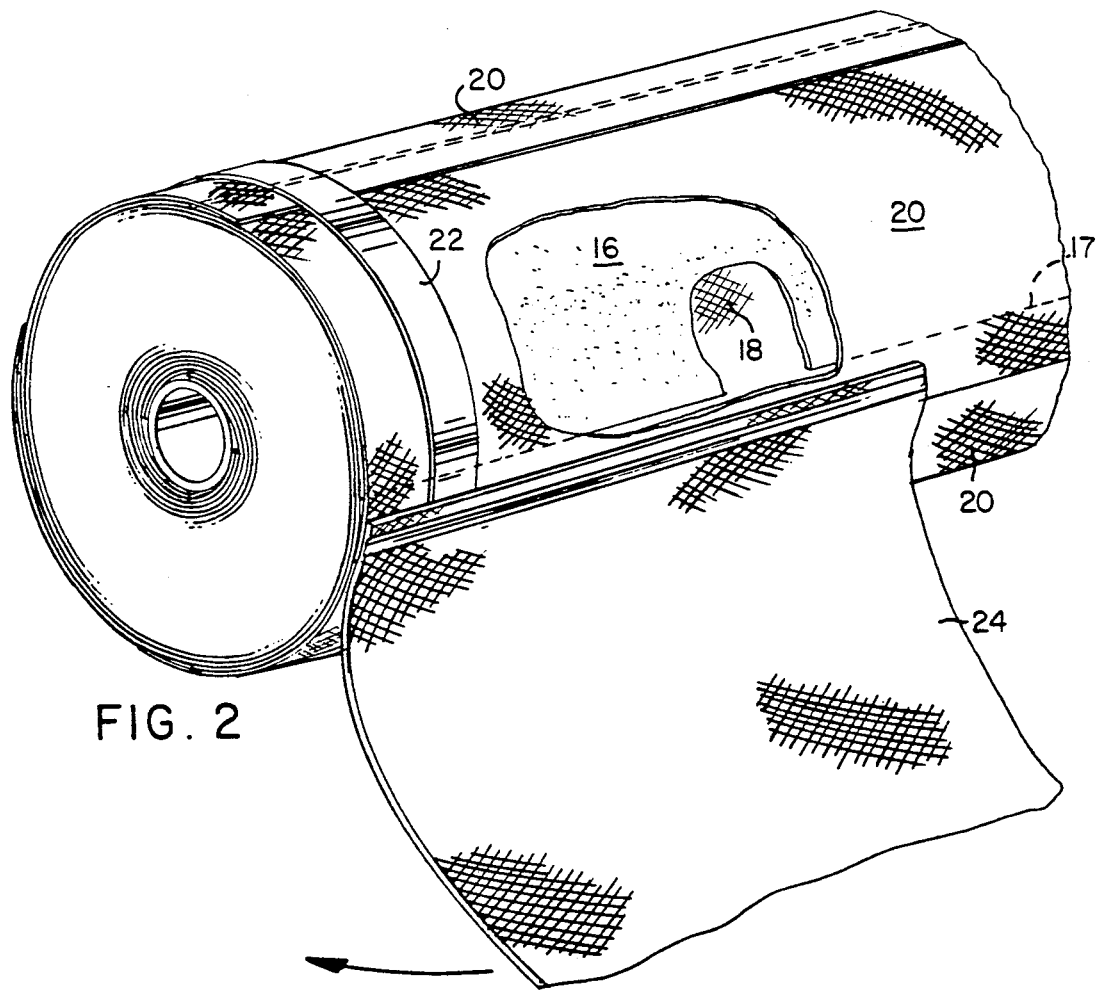
FIG. 2 is a perspective view of the module shown in FIG. 1 after the membrane leaves have been wound around the permeate tube and the bypass spacer screen has been placed.
Figure 3:
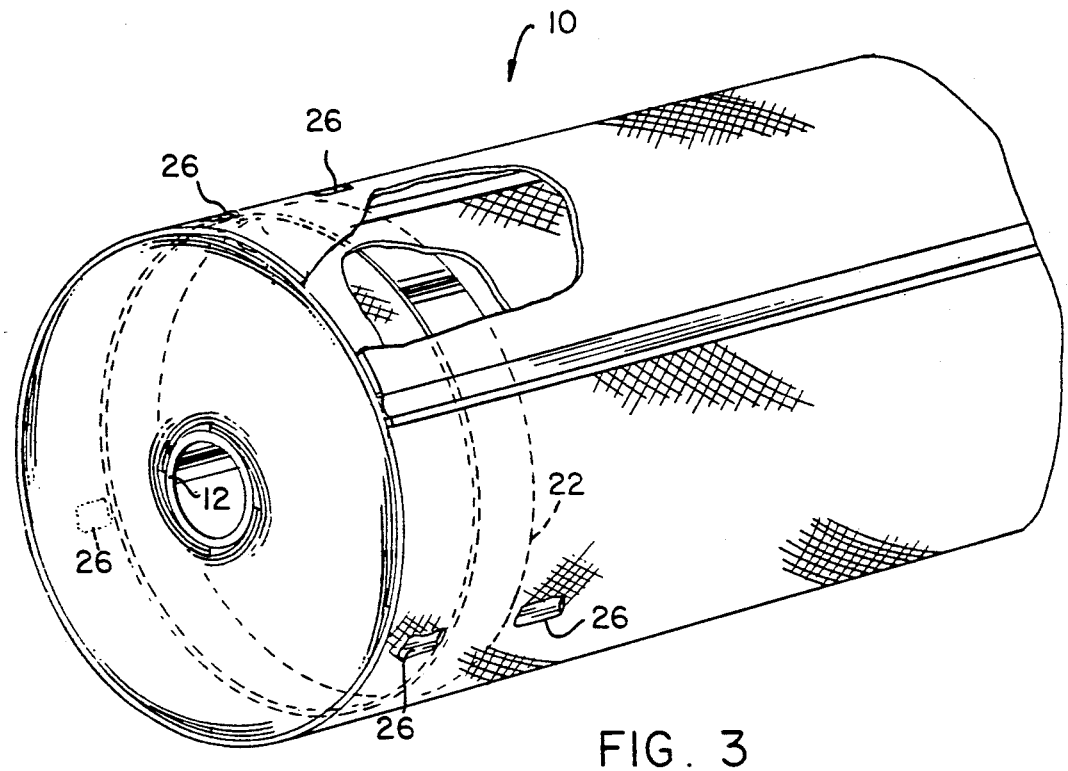
FIG. 3 is another perspective view of the completed filtration module according to the present invention with portions broken away to illustrate details of construction.

Referring initially to FIGS. 1 and 3, a filtration module is designated generally by the numeral 10 (FIG. 3) and comprises an elongated permeate collection tube 12 having a plurality of holes 14 in the tube wall.

It is well known to those skilled in the art to provide an ultrafiltration module by spirally wrapping a plurality of ultrafiltration envelopes or leaves 16 circumferentially around tube 12 in the manner illustrated in FIG. 1. Each leaf 16 will normally comprise two ultrafiltration membrane sheets separated by a permeate collection sheet which may be an open mesh screen material formed from an inert composition. The leaves are secured to the tube at the opposite ends of the latter by gluing. When the membrane leaf is wrapped around tube 12 to form a plurality of layers, the layers are separated by a feed spacer screen 18 through which fluid can easily pass as a result of the open mesh construction. The length of screen 18 which separates the membrane leaves is preferably selected so that it will extend at least to the terminal end 17 of the underlying leaf.

Most preferably, the screen 18 will extend circumferentially beyond the terminal ends of the respective underlying leaves so as to present an outerwrap 20 which completely surrounds the wound leaves. Thus, in the preferred embodiment shown in the drawings, outerwrap 20 is presented by four feed spacer screens which extend beyond the terminal ends of the underlying membrane leaves and overlap each other to present an outerwrap that completely circumscribes the spirally wound leaves.

Once outerwrap 20 is in place, a plurality of restraining bands 22 are placed over it at longitudinally spaced locations along the length of the spiral assembly. Bands 22 are sized to be slightly larger in diameter than the outside diameter of outerwrap 20 so that the bands can be easily moved into position on the module. Bands 22 are preferably constructed from a heat shrinkable composition such as polytetrafluoroethylene polymer which will respond at temperatures of between 750°–1000° F. applied in a localized fashion while slowly rotating the module. A typical module will require a total time of three to five minutes to completely shrink each band diameter by 10–15%.

Figure 4:
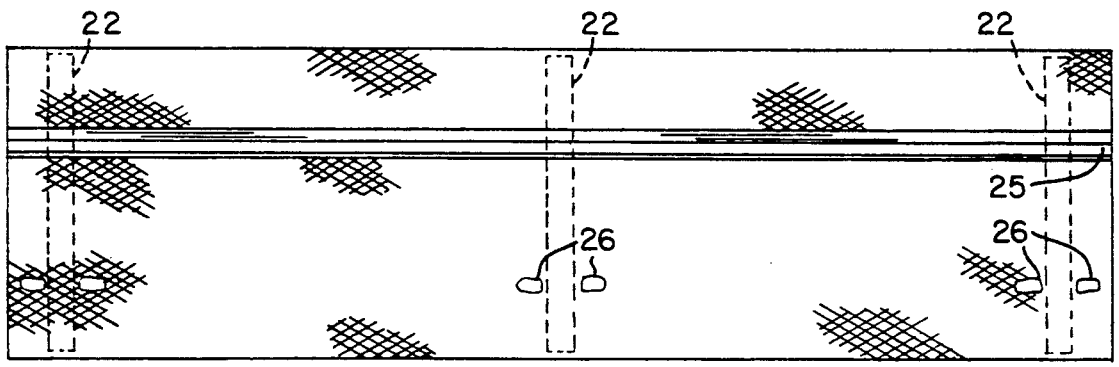
FIG. 4 is a side elevational view of the module according to the present invention.

After bands 22 are in place in tight contact with the outerwrap 20, they will hold the entire module assembly in tight spiral configuration thus precluding circumferential expansion and feed spacer screen extrusion. A final bypass spacer screen 24 is attached to the outerwrap 20 in a manner so as to overlie restraining bands 22. Screen 24 is another sheet of open mesh material. This screen is fused to the outerwrap 20 (except for the areas where bands 22 are located) and then spirally wound around the circumference of the module assembly overlapping itself slightly before terminating. The bypass screen 24 is then fused to itself in the overlap area which fused area is designated by the numeral 25 in FIGS. 3 and 4. Next, the bypass screen 24 is fused to the outerwrap 20 at spaced apart locations designated by the numeral 26 on either side of bands 22 and circumferentially spaced around the perimeter of the assembled module 10. The fused areas 26 serve to lock bands 22 in place against movement in an axial direction along the spiral assembly.

In use, a fluid to be filtered is introduced as feed stock at one end of the housing (not shown) into which module 10 is adapted to be inserted. This feed stock passes in a axial direction along the channels created by the feed channel spacer screens 18. The permeate fraction may then enter the membrane material of the individual leaves 16 and eventually will be discharged from the membrane envelope and enter tube 12 through openings 14. The filtrate will continue to flow axially and will be removed through a separate filtrate outlet of the housing. By virtue of the ability of bypass screen 24 to pass fluid, there is no dead area between the module and its associated housing which could interrupt flow efficiency or interfere with hygienic integrity. Similarly, even though bands 22 are not capable of passing fluid, they are surrounded on all sides by screen material (outerwrap 20 and bypass screen 24) which will assure continual passage of fluid over the band surfaces thus maintaining hygienic integrity. Manifestly, bands 22 are of a sufficient strength so as to retain the original diameter of the module assembly notwithstanding the tendency of the feed spacer screen material to extrude under the operating conditions previously discussed.

It will be appreciated that the present invention also encompasses a method of constructing a spiral wound filtration module by providing a longitudinally extending permeate carrier tube, providing at least one filtration membrane leaf, providing a fluid passable spacer means on top of said membrane leaf, attaching the leaf to the tube in a manner well known to those skilled in the art, followed by wrapping the membrane leaf and the spacer means around the tube to present a plurality of spaced membrane layers. The length of the spacer means is selected so that it will extend at least to the terminal end of the outermost layer of the membrane leaf and, preferably, beyond the ends of the leaves sufficiently to form an outerwrap screen which surrounds the wound leaves. A plurality of restraining bands are tightly secured around the outerwrap at longitudinally spaced apart locations to hold the wound layers and the outerwrap in place. A fluid passable spacer means is then wrapped around the restraining bands and the outerwrap to assure the presence of a fluid passable surface on all sides of the restraining bands 22. The spacer screen 24 is secured in place by overlapping onto itself and fusing the overlapped portions together to present the completed module assembly. Preferably, the bypass spacer screen is also fused to the outerwrap at circumferentially spaced locations on either side of bands 22 so as to lock the bands in place and preclude axial movement in either direction.

The mesh material which is utilized for the feed spacer screen 18, the outerwrap 20 and the bypass spacer screen 24 may be made of various inert compositions well known to those skilled in the art. Typical materials include high and low density polyolefins, such as polyethylene, polypropylene or polyester. Nylon TM (Reg. TM) and other materials having comparable characteristics are also acceptable.

It will be appreciated that the bands 22 may be constructed from various materials so long as the material is unreactive with the substance being filtered and is also capable of being tightly engaged with the spiral wound assembly. Likewise, the number of bands and the spacing (if any) between bands can be varied to meet the operating requirements or economics of a particular filtration module. While a plurality of bands in spaced relationship will normally be utilized, a single wide band may be suitable for a particular installation.

It will also be appreciated that while it is preferable to form outerwrap 20 by extending feed spacer screens beyond the terminal ends of the respective underlying leaves, it would also be possible to form the outerwrap by a separate screen which is fused to a feed spacer screen and then wound around the circumference of the spirally wound leaves.

The method and device of the present invention are applicable to various types of cross flow filtration including ultrafiltration, microfiltration and reverse osmosis.

From the foregoing, it will be seen that this invention is one well adapted to attain all the ends and objects hereinabove set forth as well as other advantages which are likely to become apparent upon utilization of the invention in commercial applications.

It will be understood that certain features and subcombinations of the invention disclosed are of utility and may be employed without reference to other features and subcombinations. This is contemplated by and is within the scope of the claims.

Since many possible embodiments may be made of the invention without departing from the scope thereof, it is understood that all matter herein set forth or shown in the accompanying drawings is to be interpreted as illustrative and not in a limiting sense.

Having thus described the invention, we claim:

1. A spiral filtration module for filtering a fluid into a filtrate portion and permeate portion, said module being adapted to be received in a housing and comprising:
   a longitudinally extending permeate tube;
   at least one filtration membrane leaf wrapped around said tube to form a plurality of layers;
   means for separating said layers to accommodate the flow of said fluid between same and for presenting an outerwrap around said wound layers;
   band means extending around said outerwrap and in tight engagement with the latter to hold said wound layers and the outerwrap against expansion; and
   spacer means and said outerwrap means both characterized by the ability to pass fluid through when said module is placed in said housing;

2. The invention of claim 1, wherein is included means for joining said spacer means to said outerwrap means on opposite sides of said band means thereby precluding lateral movement of said band means.

3. The invention of claim 2, wherein is included a plurality of said leaves joined to said tube at circumferentially spaced apart locations, and a plurality of said means for separating said leaves.

4. The invention of claim 2, wherein said outerwrap and said spacer means both comprise thermoplastic material and said joining means comprises a thermal-weld.

5. The invention of claim 1, wherein said band means comprises a heat shrinkable material.

6. A method of constructing a spiral wound filtration module of the type adapted to be received in a housing for filtering a fluid into a filtrate portion and a permeate portion, said method comprising:

providing a longitudinally extending permeate carrier tube;
providing at least one filtration membrane leaf;
providing a fluid passable spacer means on top of said membrane leaf;
attaching said leaf to said tube;
wrapping said membrane leaf and said spacer means around said tube to present a plurality of membrane layers separated by said spacer means and a fluid passable outerwrap around the wound membrane leaf;
securing a band means tightly around said outerwrap to hold said wound layers and said outerwrap in place; and
wrapping a fluid passable spacer means around said wound layers and said outerwrap;

7. A method as set forth in claim 6, wherein is included the additional step of joining said spacer means to said outerwrap on opposite sides of said band means so as to preclude lateral movement of said band means.

8. A method as set forth in claim 6, wherein is included the step of securing said spacer means in its wrapped position.

9. A method as set forth in claim 8, wherein said providing steps comprises providing a plurality of said membrane leaves and said spacer means, and said attaching step comprises attaching said leaves at circumferentially spaced locations.

10. A method as set forth in claim 8, wherein said outerwrap and said spacer means both comprises thermoplastic material and said joining step comprises thermal welding.

11. A method as set forth in claim 10, wherein said securing step comprises heat shrinking said band means around said leaf.

* * * * *

UNITED STATES PATENT AND TRADEMARK OFFICE
CERTIFICATE OF CORRECTION

PATENT NO.  : 5,073,263
DATED       : December 17, 1991
INVENTOR(S) : Carlos A. Fagundes, et al.

It is certified that error appears in the above-indentified patent and that said Letters Patent is hereby corrected as shown below:

Col. 4, lines 62-64 should read as follows:

spacer means extending around said band means and said outerwrap
      presenting means, said spacer means and said outerwrap means both characterized by
      the ability to pass fluid through when said module is placed
      in said housing.

Col. 6, line 19, the word "comprises" should read - - comprise - -.

Signed and Sealed this

First Day of October, 1996

Attest:

BRUCE LEHMAN

*Attesting Officer*   *Commissioner of Patents and Trademarks*